US007190793B2

(12) United States Patent
Hsu

(10) Patent No.: US 7,190,793 B2
(45) Date of Patent: Mar. 13, 2007

(54) KEY GENERATION IN A COMMUNICATION SYSTEM

(75) Inventor: Raymond T. Hsu, San Diego, CA (US)

(73) Assignee: Qualcomm Incorporated

( * ) Notice: Subject to any disclaimer, the term of this patent is extended or adjusted under 35 U.S.C. 154(b) by 349 days.

(21) Appl. No.: 10/912,898

(22) Filed: Aug. 6, 2004

(65) Prior Publication Data

US 2005/0081036 A1    Apr. 14, 2005

Related U.S. Application Data

(62) Division of application No. 10/177,017, filed on Jun. 20, 2002, now abandoned.

(51) Int. Cl.
*H04K 1/00*    (2006.01)
*H04L 9/00*    (2006.01)

(52) U.S. Cl. ..................... 380/270; 713/168

(58) Field of Classification Search ............. 380/270, 380/44, 247; 713/168–171, 175
See application file for complete search history.

(56) References Cited

U.S. PATENT DOCUMENTS

2003/0051140 A1* 3/2003 Buddhikot et al. ......... 713/169

* cited by examiner

*Primary Examiner*—Hosuk Song
(74) *Attorney, Agent, or Firm*—David J. Huffaker; Sandip Minhas; Thomas Rouse

(57) ABSTRACT

A communication system generates a Master Session Key (MSK) for accesses to a system entity that does not provide encryption to traffic. Both the home server and the user generate the same MSK. The MSK is used to generate encryption keys for traffic. In one embodiment the MSK is generated using a hashing function and information specific to the requester. The home server determines the need to generate the MSK based on information contained in an access request message. Once generated, the MSK is provided to the system entity to enable the entity to encrypt communications.

12 Claims, 4 Drawing Sheets

KEY GENERATION IN A COMMUNICATION SYSTEM

CROSS REFERENCE

This Application is a divisional of U.S. application Ser. No. 10/177,017; filed on Jun. 20, 2002 now abandoned, entitled "Key Generation in a Communication System".

REFERENCE TO CO-PENDING APPLICATIONS FOR PATENT

The present Application for Patent is also related to the following co-pending Applications for Patent:

"Authentication in a Communication System," application Ser. No. 10/177,088; filed on Jun. 20, 2002, assigned to the assignee hereof and hereby expressly incorporated by reference; and "Inter-working Function for a Communication System," application Ser. No. 10/176,562, filed on Jun. 20, 2002 assigned to the assignee hereof and hereby expressly incorporated by reference.

BACKGROUND

1. Field

The present relates to an inter-working function for a communication system, and more specifically to mechanisms for common authentication and key exchange through an inter-working function for use in a Wireless Local Area Network (WLAN).

2. Background

A Wireless Local Area Network (WLAN) allows users virtually unrestricted access to Internet Protocol (IP) services and data networks. The use of a WLAN is not limited to laptop computers and other computing devices, but is rapidly expanding to include cellular telephones, Personal Digital Assistants (PDA)s, and other small wireless devices supported by an external network or carrier. For example, a wireless device communicating via a cellular carrier may roam into a WLAN in a cyber-cafe or workspace. In this situation, the wireless device has access to the cellular system, but desires access to the WLAN. The WLAN access requires authentication. As the wireless device has already gained access to the cellular system, the need for further authentication is redundant. There is a need therefore, for a mechanism that allows a common authentication for access to a cellular system and to a WLAN. Further, there is a need for a common mechanism for generating encryption keys used during communications.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figure 1:
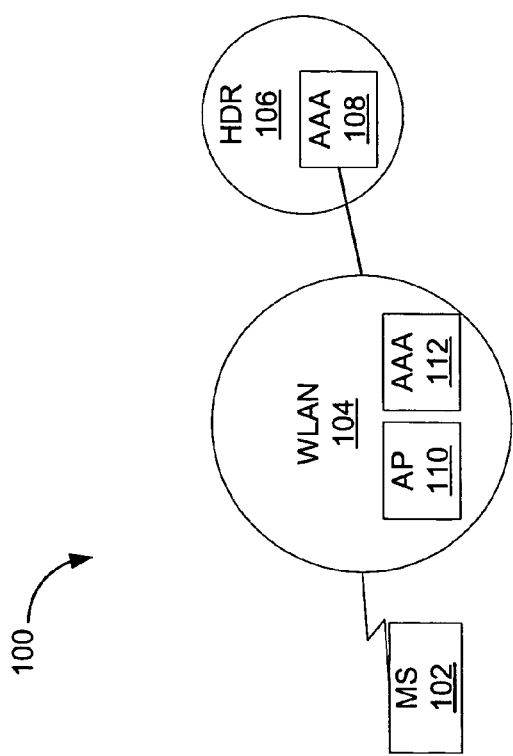
FIG. 1 is a communication system including an High Data Rate or HDR type network and a Wireless Local Area Network (WLAN).

FIG. 1 illustrates a communication system having a Wireless Local Area Network (WLAN) 104 with multiple Access Points (APs). An AP is a hub or bridge that provides a star topology control of the wireless side of the WLAN 104, as well as access to a wired network.

Each AP 110, as well as others not shown, supports a connection to a data service, such as the Internet. A MS 102, such as a laptop computer, or other digital computing device, communicates with an AP via the air interface, thus the term Wireless LAN. The AP then communicates with an Authentication Server (AS) or Authentication Center (AC). The AC is a component for performing authentication services for devices requesting admittance to a network. Implementations include Remote Authentication Dial-In User Service (RADIUS), which is an Internet user authentication described in RFC 2138, "Remote Authentication Dial In User Service (RADIUS)" by C. Rigney et al., published April 1997, and other Authentication, Authorization and Accounting (AAA) servers.

Wireless networking is emerging as a significant aspect of internetworking. It presents a set of unique issues based on the fact that the only boundary of a wireless network is the radio signal strength. There is no wiring to define membership in a network. There is no physical method to restrict a system within radio range to be a member of a wireless network. Wireless networking, more than any other networking technology, needs an authentication and access control mechanism. Various groups are currently working on developing a standard authentication mechanism. Currently the accepted standard is the IEEE 802.11.

The nature of an RF based network leaves it open to packet interception by any radio within range of a transmitter. Interception can occur far outside the users 'working' range by using hi-gain antennas. With readily available tools, the eavesdropper is not limited to just collecting packets for later analysis, but can actually see interactive sessions like web pages viewed by a valid wireless user. An eavesdropper can also catch weak authentication exchanges, like some website logins. The eavesdropper could later duplicate the logon and gain access.

Once an attacker has gained the knowledge of how a WLAN controls admittance, he may be able to either gain admittance to the network on his own, or steal a valid user's access. Stealing a user's access is simple if the attacker can mimic the valid user's MAC address and use its assigned IP address. The attacker waits until the valid system stops using the network and then takes over its position in the network. This would allow an attacker direct access to all devices within a network, or to use the network to gain access to the wider Internet, all the while appearing to be a valid user of the attacked network. Therefore, authentication and encryption become key concerns in implementation of a WLAN.

Authentication is the process of proving the identity of an individual or application in a communication. Such identification allows the service provider to verify the entity as a valid user and also to verify the user for the specific services requested. Authentication and authorization actually have very specific meanings, though the two names are often used interchangeably, and in practice are often not clearly distinguished.

Authentication is the process where a user establishes a right to an identity—in essence, the right to use a name. There are a large number of techniques that may be used to authenticate a user—passwords, biometric techniques, smart cards, certificates.

A name or identity has attributes associated with it. Attributes may be bound closely to a name (for example, in a certificate payload) or they may be stored in a directory or other database under a key corresponding to the name. Attributes may change over time.

Authorization is the process of determining whether an identity (plus a set of attributes associated with that identity) is permitted to perform some action, such as accessing a resource. Note that permission to perform an action does not guarantee that the action can be performed. Note that authentication and authorization decisions can be made at different points, by different entities.

In a cellular network, the authentication feature is a network capability that allows cellular networks to validate the identity of wireless device, thereby reducing unauthorized use of cellular networks. The process is transparent to subscribers. Customers are not required to do anything to authenticate the identity of their phones when they make a call.

Authentication typically involves a cryptographic scheme, wherein the service provider and the user have some shared information and some private information. The shared information is typically referred to as a "shared secret."

The A-Key

The authentication key (A-key) is a secret value that is unique to each individual cellular phone. It is registered with the cellular service provider and stored in the phone and Authentication Center (AC). The A-key is programmed into the phone by the manufacturer. It can also be entered manually by the user, from the wireless device menu, or by a special terminal at the point of sale.

The wireless device and the AC must have the same A-key to produce the same calculations. The primary function of the A-key is to be used as a parameter to calculate the shared secret data (SSD).

The Shared Secret Data (SSD)

The SSD is used as an input for authentication calculations in the wireless device and the AC, and is stored in both places. Unlike the A-key, the SSD may be modified over the network. The AC and the wireless device share three elements that go into the calculation of the SSD: 1) the Electronic Serial Number (ESN); 2) the Authentication Key (A-Key); and 3) a RANDom number for Shared Secret Data calculation (RANDSSD).

The ESN and RANDSSD are transmitted over the network and over the air interface. The SSD is updated when a device makes its first system access, and periodically thereafter. When the SSD is calculated, the result is two separate values, SSD-A and SSD-B. SSD-A is used for authentication. SSD-B is used for encryption and voice privacy.

Depending on the capabilities of the serving system, SSD may be shared or not shared between the AC and serving Mobile Switching Center (MSC). If secret data is shared, it means the AC will send it to the serving MSC and the serving MSC must be capable of executing CAVE. If it is not shared, the AC will keep the data and perform authentication.

The type of sharing affects how an authentication challenge is conducted. An authentication challenge is a message sent to challenge the identify of the wireless device. Basically, the authentication challenge sends some information, typically random number data, for the user to process. The user then processes the information and sends a response. The response is analyzed for verification of the user. With shared secret data, a challenge is handled at the serving MSC. With non-shared secret data, a challenge is handled by the AC. By sharing secret data, the system may minimize the amount of traffic sent and allow challenges to happen more quickly at the serving switch.

Authentication Procedures

In a given system, a Home Location Register (HLR) controls the authentication process by acting as intermediary between the MSC and AC. The serving MSC is set up to support authentication with the mobile's HLR and vice versa.

The device initiates the process by notifying the serving MSC if it is capable of authentication, by setting an authorization field in the overhead message train. In response, the serving MSC starts the registration/authentication process with an Authentication Request.

By sending the Authentication Request, the serving MSC tells the HLR/AC whether it is capable of doing CAVE calculations. The AC controls which of the serving MSC's as well as device capabilities will be used out of those available. When the serving MSC does not have CAVE capability, the SSD cannot be shared between the AC and MSC and therefore all authentication processes are performed in the AC.

The purpose of the Authentication Request (AUTHREQ) is to authenticate the phone and request SSD. The AUTHREQ contains two parameters for authentication, the AUTHR and RAND parameters. When the AC gets the AUTHREQ, it uses the RAND and the last known SSD to calculate AUTHR. If it matches the AUTHR sent in the AUTHREQ then authentication is successful. The return result to the AUTHREQ will contain the SSD if it can be shared.

The Challenge

The Authentication process consists of a challenge and response dialog. If SSD is shared, the dialog runs between the MSC and the device. If SSD is not shared, the dialog runs between the HLR/AC and the device. Depending on the switch type, the MSC may be capable of either a Unique Challenge, a Global Challenge, or both. Some MSCs are currently not capable of global challenge. The Unique Challenge is a challenge that occurs during call attempts only, because it uses the voice channel. Unique challenge presents an authentication to a single device during call origination and call delivery. The Global Challenge is a challenge that occurs during registration, call origination, and call delivery. The Global challenge presents an authentication challenge to all MSs that are using a particular radio control channel. It is called global challenge because it is broadcast on the radio control channel, and the challenge is used by all phones accessing that control channel.

During a challenge, the device responds to a random number provided by the MSC or AC. The device uses the random number and shared secret data stored in the device to calculate a response to the MSC. The MSC also uses the random number and shared secret data to calculate what the response from the device should be. These calculations are done through the CAVE algorithm. If the responses are not the same, service is denied. The challenge process does not increase the amount of time it takes to connect the call. In fact, the call may proceed in some cases, only to be torn down when authentication fails.

Wireless Local Area Networks (WLANs) have gained tremendous popularity as a means of providing users with untethered access to IP data networks. High Data Rate (HDR) networks such as 1xEV-DO networks and other third generation (3G) networks are also designed to offer high-speed data access; although the data rates they support are typically lower than those of WLANs, 3G networks offer data coverage over a much wider area. Though they might be viewed as competitors, WLAN and HDR networks may be complementary: WLANs offer high-capacity "hot-spot" coverage in public areas such as airport lounges and hotel lobbies, while HDR networks can provide users with nearly ubiquitous data service while on the move. Therefore, the same carrier may provide both HDR and WLAN access services under a single user subscription. This means that the MS uses the same authentication method and secret to both types of access authentication.

One protocol, such as the Challenge Handshake Authentication Protocol (CHAP), which is also referred to as MD5-Challenge, may be used for both HDR network and WLAN access authentication. CHAP specifically uses the RADIUS protocol to authenticate a terminal without sending security data. The MS is authenticated by its home RADIUS server, wherein the home RADIUS server and the MS share a root secret. After the MS is authenticated successfully via a CHAP challenge, the MS and the home or HDR network derive the same encryption keys that are to be used to protect traffic exchanged between the MS and the WLAN Access Point (AP).

After successful WLAN access authentication via a CHAP challenge, the home RADIUS server and the MS generate the same Master Session Key (MSK) from the shared root secret. The MSK will be used to derive encryptions keys for the protection of actual traffic between the MS and the AP of the WLAN. The shared root secret is configured to the MS and is static. The MSK is generated on a per packet data session and is only constant during the session. For a new session, a new MSK is generated from the shared root secret using a different random number.

Since the MSK is not required when the MS is accessing the HDR network, one embodiment provides a mechanism to allow the home RADIUS server to determine whether the MS is accessing WLAN or the HDR network.

FIG. 1 illustrates a communication system 100 including an HDR network 106, a WLAN 104, and an MS 102. The MS 102 is able to access the HDR network 106, and has roamed into a WLAN 104 coverage area. The MS 102 seeks access to the WLAN 104 via the AP 110 within the WLAN 104. Note that WLAN 104 may include any number of APs (not shown). The WLAN 104 also includes an Authentication Authorization and Accounting entity or server 112. Note that the HDR network 106 also includes an AAA server 108.

Figure 2:
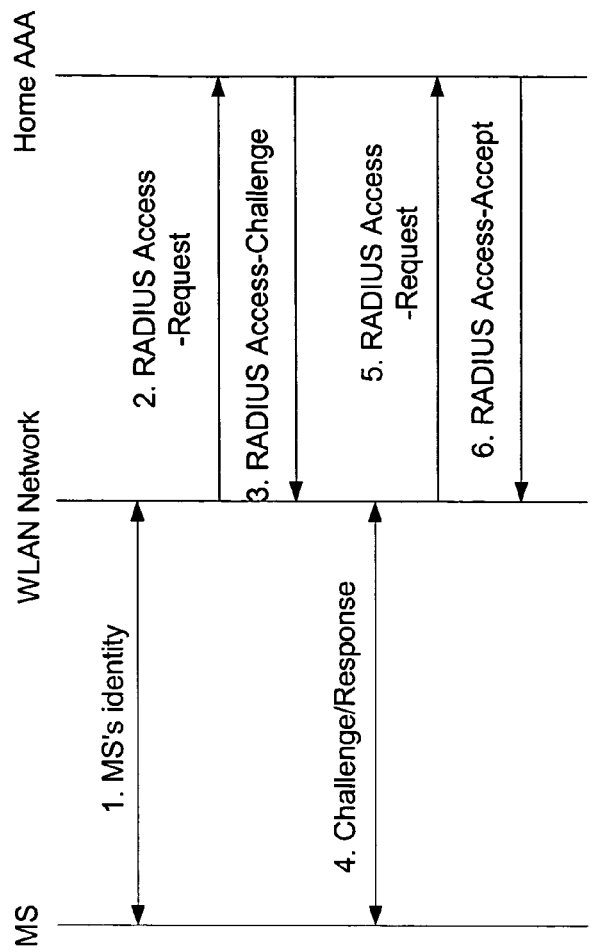
FIG. 2 is a timing diagram of authentication procedure in a communication system.

FIG. 2 illustrates the message flow for access authentication to a WLAN when CHAP or the MD5-Challenge is used in the communication system 100. The MS 102 uses a Network Access Identifier (NAI) for identification. The NAI has the format of username@realm, where realm identifies the home network of the MS, which in this instance is HDR network 106. The AAA server 112 in the WLAN network 104 initiates a RADIUS Access-Request message to the AAA server 108 at the home network of the MS 102, i.e., to the HDR network 106. Note the HDR network 106 may be any network that supports high data rate transmissions. The AAA 108 then issues a CHAP Challenge to the MS 102 via the WLAN 104. The MS 102 calculates a response based on the challenge, such as a random number, and the response is conveyed as a RADIUS Access-Request request to the AAA 108 via the WLAN 104. If authentication is successful, the home AAA server 108 acknowledges such with a RADIUS Access-Accept message granting the MS 102 access to the WLAN network 104. As discussed hereinabove, both the home AAA server 108 and the MS 102 generate a same Master Session Key (MSK) from a shared root secret.

As stated hereinabove, the CAVE algorithm is commonly used for cellular communications and therefore, is well used and distributed. Alternate algorithms for authentication are also used. Specifically in data communications a variety of algorithms exist of varying complexity and application. To coordinate these mechanisms, the Extensible Authentication Protocol (EAP) has been developed as a general protocol framework that supports multiple authentication and key distribution mechanisms. The EAP is described in "PPP Extensible Authentication Protocol (EAP)" by L. Blunk et al, RFC 2284, published March 1998.

One such mechanism supported by the EAP as defined in "EAP AKA Authentication" by J. Arkko et al., published as an Internet Draft in February 2002, is the AKA algorithm. There is a need therefore to extend EAP to include the cellular algorithm CAVE. This is desirable to provide back compatibility for new systems and networks.

EAP

The Extensible Authentication Protocol (EAP) is a general protocol for authentication which supports multiple authentication mechanisms. EAP does not select a specific authentication mechanism during link set up and control, but rather postpones this until the authentication procedure begins. This allows the authenticator to request more information before determining the specific authentication mechanism. The authenticator is defined as the end of the link requiring the authentication. The authenticator specifies the authentication protocol to be used in the during link establishment.

Key Generation

A key hierarchy is the sequence of steps that are used to generate from a root key a set of encryption keys that are used to either encrypt/decrypt messages or authenticate messages. A key hierarchy should include some time varying information so that the same set of encryption keys is not generated each time the hierarchy is used. A key hierarchy should also be set up such that if the derived encryption keys were to become known, the root key could not be obtained from the encryption keys.

In one embodiment, an overall key hierarchy consists of three smaller layered key hierarchies: master key hierarchy; rekeying key hierarchy; and per-packet key hierarchy. The master key hierarchy may include EAP keying, pre-shared key, or random number, depending on the hierarchy and authentication method. If EAP keying is used for the master key hierarchy, the master key hierarchy will normally reside on the RADIUS server.

The rekeying key hierarchy has two types which are called Pairwise key hierarchies and Group key hierarchies. The steps in these two types of hierarchies are similar; only the inputs to the two types are different.

The per-packet key hierarchy. This may be either for TKIP (using an RC4 encryption engine), or for AES.

Pairwise key hierarchies are used to derive the keys that are used between two entities in a wireless network (AP and associated station, or a pair of stations in a network).

Group key hierarchies are used to derive and transfer keys that are used by all entities in a wireless group (an AP and all stations associated with that AP in a network, or all entities in a network).

Pairwise key hierarchies are instantiated in parallel on the two entities that are using the Pairwise key, with each entity calculating the same set of encryption keys using shared information. One of the two entities drives the Pairwise key hierarchy, that entity is known as the Pairwise key owner. For a given network, the Pairwise key owner is the AP; for other networks each possible pair of stations will have a Pairwise key hierarchy, and the Pairwise key owner is the station of the pair with the lower Medium Access Control layer address.

Group key hierarchies are instantiated only on one entity, and the derived encryption keys are promulgated to all the other entities; the entity that drives the Group key hierarchy is the Group key owner. For a given network, such as referred to as a Basic Service Set (BSS), the Group key owner is the AP; for an Independent Basic Service Set (IBSS) network the Group key owner is the current beacon transmitter. Note that a BSS network is made up of an AP and associated stations, whereas an IBSS network is made up of a set of stations, all of which are peers of one another. As used herein station is a workstation, and includes a mobile station or other wireless device capable of accessing a local area network.

Each station will have at least two key hierarchies' instantiated, and quite probably more. In a BSS network, the AP will have a Pairwise key hierarchy instantiated for each station that is associated, and also at least one Group key hierarchy; the AP will be the key owner for all these hierarchies. Each associated station will have one Pairwise key hierarchy instantiated, and at least one Group key hierarchy. For the IBSS network, each station will have a Pairwise key hierarchy instantiated for every other station in the network, as well as a single Group key hierarchy.

The key owner will have a single Group rekeying hierarchy instantiation for the Group keys, and a Pairwise rekeying hierarchy instantiation for each association. A key owner will have a per-packet key hierarchy per Temporary Key Integrity Protocol (TKIP) temporal key for both Group and Pairwise temporal keys (if any). A non-key owner will have a rekeying hierarchy instantiation for Group keys and Pairwise keys per association, and a per-packet key hierarchy per TKIP temporal key for both Group and Pairwise temporal keys (if any).

MSK

According to the exemplary embodiment, the MSK includes the Cellular Message Encryption Algorithm (CMEA) key, which is used for protecting MS traffic such as to a WLAN, and a Cipher Key (CK).

Figure 3:
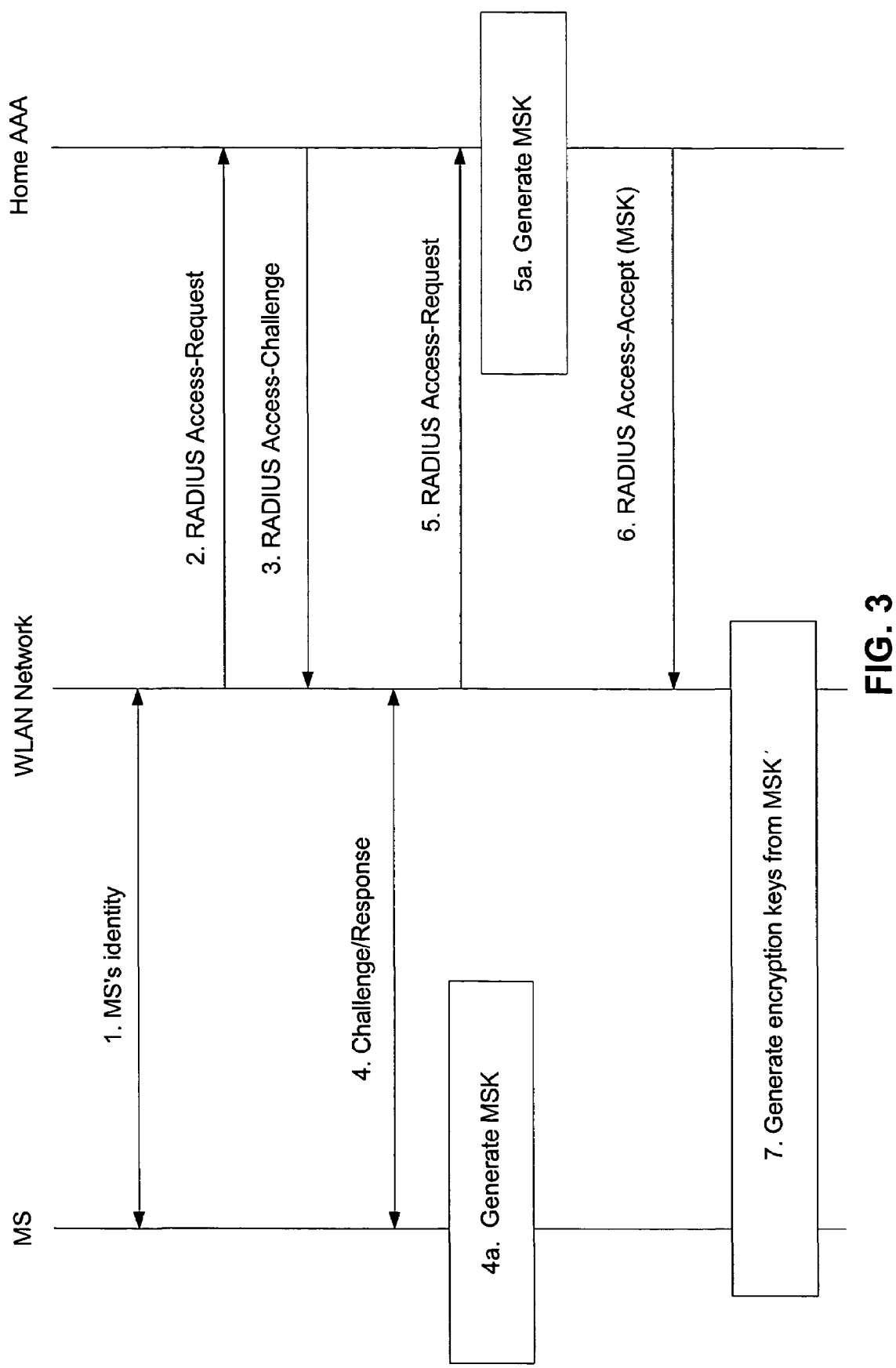
FIG. 3 is a timing diagram of an authentication procedure in a communication system.

FIG. 3 illustrates the key hierarchy for generating encryption keys to protect traffic between the MS 102 and WLAN network 104. The process begins with the negotiation of the MS 102 identity. The WLAN 104 then sends a RADIUS access request message to the AAA 108, which responds with a RADIUS access challenge message. The WLAN 104 passes the challenge to the MS 102, which calculates a response therefrom. The MS 102 response to the challenge is then provided to the WLAN 104. In step 4a, after the MS 102 sends the authentication response to the WLAN 104, the MS 102 uses the root secret to generate the Master Session Key (MSK).

The WLAN 104 sends the RADIUS access request message to the AAA 108, including the challenge response. In step 5a, if the MS 102 is authenticated successfully, the home AAA server 108 uses the MS 102 root secret to generate the same MSK as generated by the MS 102 at step 4a. In step 6, the home AAA server 108 includes the MSK in the RADIUS Access-Accept message, using an attribute, such as the MS-MPPE-Recv-Key attribute. In step 7, the MS 102 and WLAN network 104 use the procedures such as those specified in the document entitled "Draft Supplement to Standard for Telecommunications and Information Exchange Between Systems—LAN/MAN Specific Requirements—Part 11: Wireless Medium Access Control (MAC) and physical layer (PHY) specifications: Specification for Enhanced Security" IEEE Std 802.11i/D2.0, March 2002, (herein referred to as "the 802.11i standard), to generate encryption keys from the MSK.

The following provides two examples of algorithms and parameters used to generate the MSK in both the MS 102 and home AAA server 108. In a first embodiment, the MSK is defined as:

$$MSK = \text{hashing function (secret, challenge, NAI, secret)} \quad (1)$$

Wherein the MSK is the result of applying a hashing function (e.g., CHAP, HMAC) using the following parameters:

MS 102 root secret;

The challenge used to authenticate MS 102 in steps 4–5 of FIG. 3;

MS 102 NAI; and

MS 102 root secret again.

According to this embodiment, the MS 102 and home AAA server 108 have all the key materials necessary to generate the same MSK independently. In other words, no additional key materials need be exchanged between the MS 102 and home AAA server 108 for MSK generation. Note that the MSK and the MS 102 access authentication response are generated from a same challenge value. An alternate embodiment generates the MSK from a different random value.

A second example, according to another embodiment, defines the MSK as:

$$MSK = \text{hashing function (secret, } NAI, \text{ random number)} \quad (2)$$

Wherein the MSK is the result of applying a hashing function (e.g., CHAP, HMAC) on the following parameters:

MS 102 root secret;

MS 102 NAI; and

A random number generated by the home AAA server,

Wherein the random number is different from the challenge value. According to this embodiment, the MSK is generated from a random number that is different from the challenge value used in the MS 102 access authentication. The use of independent challenge values provides less correlation between the MSK and the MS 102 access authentication, and therefore, provides improved security. Note that the random number is sent to the MS 102 and the MSK generated therefrom. The random number is sent to the MS 102 via a RADIUS Access-Accept (step 6 in FIG. 3) and the mechanisms defined in the 802.11i standard (step 7 in FIG. 3).

The procedure to generate MSK is used when the MS 102 is accessing a WLAN 104, and is not used when the MS is accessing 1xEV-DO or other HDR network. This is due to the over the air encryption provided by the HDR system. As the MS initiates the access to either the WLAN network 104 or the HDR network 106, the MS 102 is able to determine whether MSK generation is needed. However, the home AAA server must also determine when to generate the MSK.

In one embodiment, a special RADIUS attribute is implemented to notify the AAA 108 to generate an MSK. In steps 2 and 5 of FIG. 3, the WLAN network 104 sends the RADIUS Access-Request message containing a special or designated attribute indicating the MS 102 desires or is requesting WLAN 104 access. The attribute status will trigger the home AAA server 108 to perform MSK generation (if the MS 102 authentication was successful). When the designated attribute is not present in the RADIUS Access-Request message, the home AAA server 108 will not perform MSK generation. Note that for implementation in a system consistent with 3GPP2, the designated attribute is specific to 3GPP2 and thus may be defined as a vendor-specific attribute with the vendor ID of 3GPP2.

Figure 4:
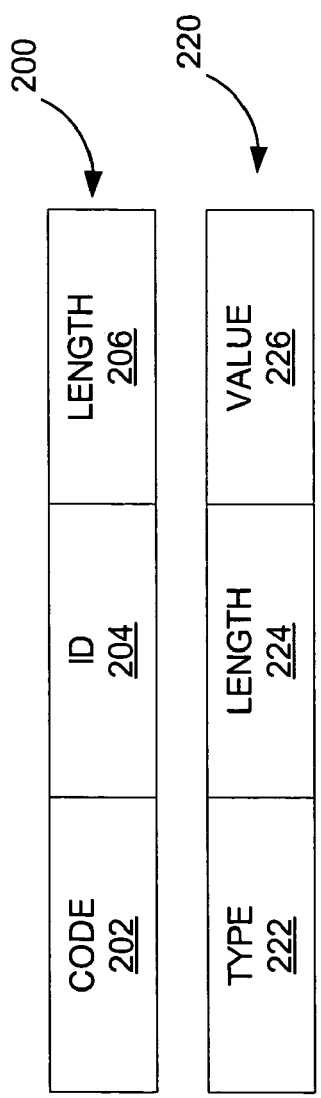
FIGS. 4 and 5 are access request message formats.

FIG. 4 illustrates the RADIUS format described in RFC 2865 entitled "Remote Authentication Dial In User Service (RADIUS)" by C. Rigney et al, published June 2000. The data format 200 includes: a code field 202 identifying the type of RADIUS packet (e.g., access request, access reject, etc.); an ID field 204 to coordinate matching requests and responses; and a length field 206 to indicate the length of the associated packet. An attribute 220 is also illustrated, including: a type field 222 identifying the contents of the value field 226; a length field 224 giving the length of the attribute; and a value field providing the specific information of this attribute. Note that RADIUS supports vendor-specific attributes, wherein the value field 226 is used to provide the vendor identification, followed by the attribute information. The vendor-specific type may be as described in RFC 2548 entitled "Microsoft Vendor-specific RADIUS Attributes" by G. Zorn, published March 1999, for application to CHAP messages.

An alternate embodiment implements a standard attribute called the Network Access Server (NAS) Internet Protocol (IP) address in the RADIUS Access-Request message. The standard attribute identifies the IP address of the RADIUS client originating the RADIUS Access-Request message. The home AAA server 108 is configured with a database containing the IP addresses of all the RADIUS clients in the WLAN network 104. If the IP address indicated in the NAS IP address attribute matches an address in the database, then the RADIUS Access-Request message is originated from the WLAN network 104, and the home AAA server 108 will perform MSK generation (if the MS authentication was successful). Otherwise, the home AAA server 108 will not perform MSK generation.

Figure 5:
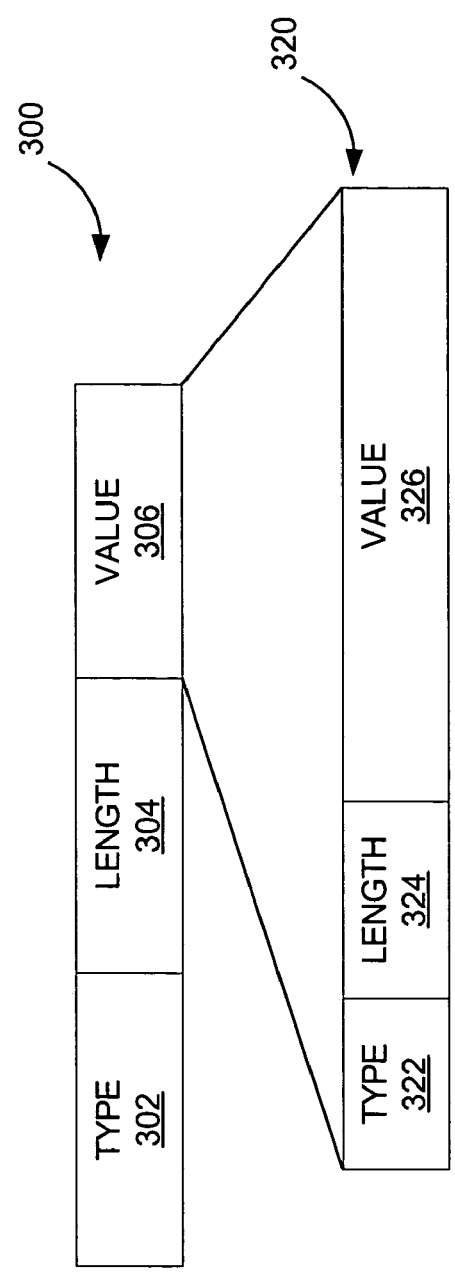

The format for the standard attribute is illustrated in FIG. 5, with an example superimposed over the value field. The attribute format 300 includes a type field 302 identifying the contents of a value field 306; a length field 304 giving the length of the attribute; and a value field 306 containing the attribute information. Note that without modification to the description given in RFC 2865, the value field 306 may be partitioned into significant fields for type 322 indicating the type of sub-attribute, such as an MSK generation instruction; a length field 324 giving the length of the sub-attribute; and a value field 326 containing the sub-attribute information, such as an MSK generation indicator. As an example, to convey a message to the AAA 108 instructing the AAA 108 on MSK generation, the type filed 322 may identify this sub-attribute as an MSK generation instruction using a corresponding predefined code. The value field 326 would then have a value either: 1—instructing the AAA 108 to generate an MSK; or 2—instructing the AAA 108 to not generate the MSK.

Figure 6:
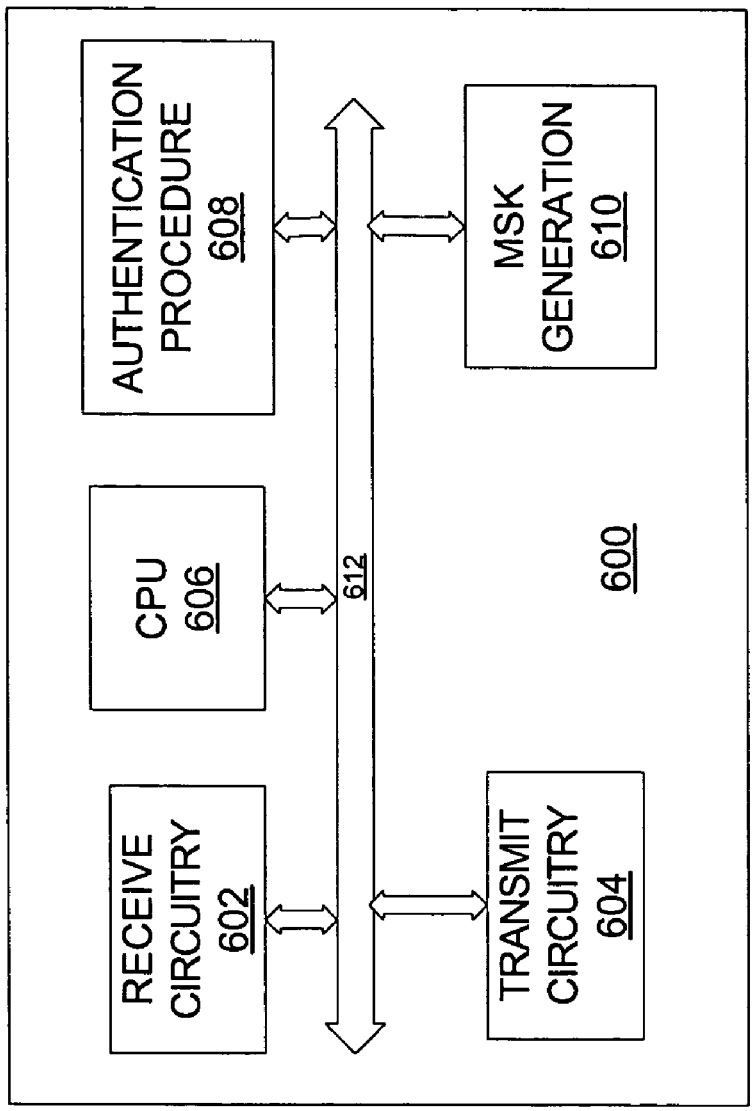
FIG. 6 is a wireless apparatus including functionality to generate a Master Session Key (MSK).

A wireless device, such as MS 102, is illustrated in FIG. 6. The device 600 includes receive circuitry 602 and transmit circuitry 604 for receiving transmissions and sending transmissions, respectively. The receive circuitry 602 and the transmit circuitry 604 are both coupled to a communication bus 612. The device 600 also includes a Central Processing Unit (CPU) 606 for controlling operations within the device 600. The CPU 606 is responsive to computer-readable instructions stored in memory storage devices within the device 600. Two such storage devices are illustrated as storing the authentication procedure(s) 608 and the MSK generation 610. Note that alternate embodiments may implement the procedure in hardware, software, firmware, or a combination thereof. The CPU 606 is then responsive to authentication processing instructions from the authentication procedure 608. The CPU 606 places the authentication procedure 608 messages into a transport format, such as an EAP format. Upon authentication to a WLAN, the CPU 606 is responsive to the MSK generation unit 610 to generate the MSK. The CPU 606 further processes received transport format messages to extract the authentication messages therefrom.

Note that while the embodiments described herein detail a WLAN, the methods and apparatus described herein are also applicable to other system entities. The present invention provides a method of enabling a system entity to provide encryption to a communication. By using the home server to generate the MSK, and providing the MSK to a system entity, that entity is provided sufficient information for secure transmissions to a user, such as a MS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for sharing an authentication key between multiple wireless networks, each network using a different over-the-air interface, comprising:
   transmitting an identifier to a first network from a mobile station (MS);
   transmitting an access request from the first network to a second network;
   triggering a challenge protocol between the first network and the MS by the second network;
   generating the authentication key at the MS and the second network; and
   providing the authentication key to the first network by the second network.

2. The method of claim 1, further comprising checking the identifier for a home network, whereupon the home network is the second network to which the access request is transmitted.

3. The method of claim 1, wherein triggering the challenge protocol between the first network and the MS comprises triggering a Challenge Handshake Authentication Protocol (CHAP) session between the first network and the MS.

4. The method of claim 3, wherein triggering the CHAP session between the first network and the MS further comprises the second network providing a challenge that is to be used by the first network during the CHAP session.

5. The method of claim 1 wherein the authentication key is used to encrypt communications between the first network and the MS.

6. The method of claim 1, wherein the first network is a non-cellular network and the second network is a cellular network.

7. The method of claim 6, wherein the first network is an Internet Protocol (IP) data network and the second network is a third generation (3G) telecommunication network.

8. Apparatus for using an authentication key generated across an Internet Protocol (IP) data network and a cellular telecommunication network, comprising:
   a server within the IP data network configured to:
      determine whether a received mobile station (MS) identifier contains a home network information;
      transmit an access request to a cellular telecommunication network server associated with the home network information if the MS identifier contains the home network information;
      perform a challenge protocol with the MS that originated the MS identifier, wherein the challenge protocol uses challenge information provided by the cellular telecommunication network server;
      forward results from the performed challenge protocol to the cellular telecommunication network server; and
      encrypt communications between the IP data network server and the MS using an authentication key provided by the cellular telecommunication network server.

9. The apparatus of claim 8, wherein the IP data network is a Wireless Local Area Network (WLAN).

10. The apparatus of claim 8, wherein the challenge protocol is the Challenge Handshake Authentication Protocol (CHAP).

11. The apparatus of claim 8, wherein the cellular telecommunication network is a third generation (3G) network.

12. Apparatus for generating an authentication key at a cellular telecommunication network to be used within an Internet Protocol (IP) data network, comprising:

a server within the cellular telecommunication network configured to:
receive an access request from an IP data network server;
trigger a challenge protocol between the IP data network server and a mobile station (MS), wherein the MS is operational on the cellular telecommunication network and the IP data network;
provide challenge information to the IP data network server, said challenge information to be used in the challenge protocol;
receive the results of the challenge protocol from the IP data network server;

generate an authentication key in accordance with the results of the challenge protocol; and forward the authentication key to the IP data network server.

* * * * *